(12) United States Patent
April et al.

(10) Patent No.: US 9,737,777 B2
(45) Date of Patent: Aug. 22, 2017

(54) SWEETSPOT TRAINER

(71) Applicants: Michael E. April, Rockville, MD (US); Marc H. Cohen, Kensington, MD (US)

(72) Inventors: Michael E. April, Rockville, MD (US); Marc H. Cohen, Kensington, MD (US)

(*) Notice: Subject to any disclaimer, the term of this patent is extended or adjusted under 35 U.S.C. 154(b) by 0 days.

(21) Appl. No.: 15/167,339

(22) Filed: May 27, 2016

(65) Prior Publication Data
US 2016/0346659 A1  Dec. 1, 2016

Related U.S. Application Data (60) Provisional application No. 62/230,102, filed on May 29, 2015.

(51) Int. Cl.
| | | |
|---|---|---|
| A63B 69/00 | (2006.01) | |
| A63B 59/00 | (2015.01) | |
| A63B 24/00 | (2006.01) | |
| A63B 71/06 | (2006.01) | |
| A63F 13/00 | (2014.01) | |
| G06F 1/16 | (2006.01) | |

(52) U.S. Cl.
CPC ...... *A63B 69/0002* (2013.01); *A63B 24/0062* (2013.01); *A63B 71/0619* (2013.01); *A63B 71/0622* (2013.01); *A63F 13/00* (2013.01); *G06F 1/1626* (2013.01); *A63B 2069/0008* (2013.01); *A63B 2071/0625* (2013.01); *A63B 2071/0655* (2013.01); *A63B 2071/0694* (2013.01); *A63B 2208/0204* (2013.01); *A63B 2220/53* (2013.01); *A63B 2220/833* (2013.01); *A63B 2225/20* (2013.01); *A63B 2225/50* (2013.01)

(58) Field of Classification Search
USPC ....... 473/202, 221, 224, 351, 437, 451, 453, 473/457
See application file for complete search history.

(56) References Cited

U.S. PATENT DOCUMENTS

| | | | | |
|---|---|---|---|---|
| 6,533,685 | B1* | 3/2003 | Otten | A63B 59/50 473/437 |
| 7,540,813 | B2* | 6/2009 | Liberatore | A63B 15/00 473/422 |
| 8,231,484 | B1* | 7/2012 | Quinn | A63B 69/0002 473/422 |
| 8,911,309 | B1* | 12/2014 | Harihar | A63B 69/0002 473/453 |
| 2009/0221388 | A1* | 9/2009 | Giannetti | A63B 69/0002 473/457 |

* cited by examiner

*Primary Examiner* — Nini Legesse
(74) *Attorney, Agent, or Firm* — Rahman LLC

(57) ABSTRACT

A lightweight sweet spot trainer includes a sleeve that is slipped over the barrel end of any bat. The sleeve covers the barrel over the primary contact area of the bat. The sleeve holds a force sensor placed inside it such that, when slid over the bat, the force sensor is coincident with the sweet spot of the bat. When a ball comes in contact with the sweet spot, the force sensor directly beneath it is triggered such that instantaneous feedback is given to the athlete thereby making him/her aware of accurate sweet spot contact. Moreover, an array of cylindrical contact/force sensors can be positioned such that the user gets feedback that would depend on how far from the sweet spot the user strikes/contacts the ball. The user may be notified by audio, visual, or sensory cues.

20 Claims, 10 Drawing Sheets

SWEETSPOT TRAINER

CROSS-REFERENCE TO RELATED APPLICATIONS

This application claims the benefit of U.S. Provisional Application No. 62/230,102, filed on May 29, 2015 and entitled "Sweetspot Trainer," the complete disclosure of which, in its entirety, is hereby incorporated by reference.

BACKGROUND

Technical Field

The embodiments herein generally relate to wireless sensors, and more particularly to embedded wireless sensors for sports training and performance enhancement.

Description of the Related Art

Hitting a moving ball (e.g., baseball, softball, cricket ball, etc.) is a complex skill If the bat, which is used to hit the ball, makes contact with the ball there is an optimal location that transfers the maximum energy to the ball and produces little to no vibration at the handle of the bat. This optimal location is called the sweet spot. The sweet spot is present on all bats but varies in its size and location depending on the bat's material.

When an athlete is using a bat to make contact with the ball, the object is to hit the sweet spot so that the maximum momentum of the bat imparts the maximum kinetic energy to the ball. Whereas experienced athletes can feel when they have made contact either on, or close to, the sweet spot, people learning this skill usually do not know what this feels like. Although they can detect this sensation, having a device to give unqualified feedback would help the athlete make more consistent contact. For less skilled athletes, getting contemporaneous feedback on whether or not they are hitting the sweet spot is necessary information for improving performance.

Conventional means of training an athlete to hit the sweet spot generally consist of passive devices such as SKLZ's "Sweet Spot Bat", MAPOWERED Baseball's "XACELL-SIOR™ Color Change Bat", PhoenixBats' "The Zone Wood Bat", and The Starting Lineup's "Pro Hammer Training Bat". Typically, to try to visualize if a player has made contact with the sweet spot, players have used tape or bats with thermochromic paint such as MAPOWERED Baseball's "XACELLSIOR™ Color Change Bat".

SKLZ has a bat that has a wood barrel with a thinner metal component connecting to the handle. This bat helps the user make contact closer to the end of the bat but it is not exclusively the sweet spot and it does not feel like the athlete's own bat. The same can be said for PhoenixBats', "The Zone Wood Bat", and The Starting Lineup's Pro "Hammer Training Bat". Generally, all of these are training devices that do not allow the athlete to use their own bat, and therefore do not give the athlete precise feedback when they strike the ball on the sweet spot of their own bat(s).

SUMMARY

In view of the foregoing, an embodiment herein provides a sports performance improvement system comprising a sleeve configured to slide over a sports bat, wherein the sports bat comprises a handle, a barrel positioned opposite to the handle, and an area in between the handle and the barrel comprising a sweet spot, wherein a location of the sweet spot on the bat comprises a location that transfers a maximum energy to a ball that is contacted by the bat and produces a minimal vibration at the handle of the bat, and wherein the sleeve comprises an inner portion comprising low friction material, wherein the inner portion comprises a pocket; at least one sensor housed in the pocket and positioned to be located coincident with a sweet spot of the bat; an outer portion comprising a marking corresponding with the location of the sweet spot on the bat, wherein the marking is positioned above the at least one sensor that is coincident with the location of the sweet spot on the bat; an end cap positioned over the sleeve and housing electronic components, wherein the end cap is positioned over a barrel of the bat; and an electrical connection within the inner portion of the sleeve and connected to the at least one sensor and the end cap, wherein the electronic components comprise any of a microcontroller; an on-device memory operatively connected to the microcontroller; an audio amplifier operatively connected to the on-device memory; an audio speaker operatively connected to the audio amplifier; a radio frequency (RF) transceiver operatively connected to any of the audio amplifier and the on-device memory, wherein the RF transceiver comprises any of a wireless local area network (WLAN) transceiver; a personal area network (PAN) transceiver; a WiFi® transceiver; a Bluetooth® transceiver; and a low energy Bluetooth® transceiver.

The electronic components further comprise a light-emitting diode (LED) operatively connected to the microcontroller; a vibration motor operatively connected to the microcontroller; a battery charger operatively connected to the microcontroller; a battery operatively connected to the battery charger; and a universal serial bus (USB) port operatively connected to the microcontroller, wherein the electronic components collectively provide at least one manner of measuring and reporting in real-time any of a contact and a force of the ball on the location of the sweet spot on the bat. The low friction material may be configured to allow the sleeve to slide over the barrel of the bat. The at least one sensor may measure a location of the ball contacting the bat. The at least one sensor may measure an area of contact between the ball contacting the bat. The at least one sensor may measure a contact force of the ball contacting the bat.

The outer portion of the sleeve may comprise flexible material. The flexible material may be configured to hold the sleeve in tight contact with the barrel of the bat. The on-device memory may comprise computer-readable files comprising pre-recorded audio. The audio speaker outputs the pre-recorded audio in real-time. Upon the ball contacting the location of the sweet spot on the bat and coincident to at least one sensor, the pre-recorded audio may be output through the audio speaker. Upon the ball contacting the location of the sweet spot on the bat and coincident to at least one sensor, the LED may light up in a predetermined pattern for a predetermined period of time. Upon the ball contacting the location of the sweet spot on the bat and coincident to at least one sensor, the vibration motor may turn on for a predetermined period of time. Upon the ball contacting the location of the sweet spot on the bat and coincident to at least one sensor, the RF transceiver may transmit a wireless signal to a linked device that is wirelessly paired to the RF transceiver. The wirelessly linked device may comprise any of a smartphone, a tablet computer, a notebook computer, and a personal computer. A transmission of the wireless signal to the linked device may provide information in real-time relating to the any of a contact and a force of the ball on the location of the sweet spot on the bat. A transmission of the wireless signal to the linked device may provide input for a video game in real-time. The at least one sensor may comprise any of a single sensor and an array of thin force or contact sensors.

Another embodiment provides a sports performance improvement system comprising a sleeve configured to slide over a sports bat, wherein the sports bat comprises a handle, a barrel positioned opposite to the handle, and an area in between the handle and the barrel comprising a sweet spot, wherein a location of the sweet spot on the bat comprises a location that transfers a maximum energy to a ball that is contacted by the bat and produces a minimal vibration at the handle of the bat, and wherein the sleeve comprises an inner portion comprising low friction material, wherein the inner portion comprises a pocket; at least one sensor housed in the pocket and positioned to be located coincident with a sweet spot of the bat; an outer portion comprising a marking corresponding with the location of the sweet spot on the bat, wherein the marking is positioned above the at least one sensor that is coincident with the location of the sweet spot on the bat; an end cap positioned over the sleeve and housing electronic components, wherein the end cap is positioned over a barrel of the bat; and an electrical connection within the inner portion of the sleeve and connected to the at least one sensor and the end cap, wherein the electronic components comprise any of a microcontroller; an on-device memory operatively connected to the microcontroller; an audio amplifier operatively connected to the on-device memory; an audio speaker operatively connected to the audio amplifier; a radio frequency (RF) transceiver operatively connected to any of the audio amplifier and the on-device memory, wherein the RF transceiver comprises any of a wireless local area network (WLAN) transceiver; a personal area network (PAN) transceiver; a WiFi® transceiver; a Bluetooth® transceiver; and a low energy Bluetooth® transceiver.

The electronic components further comprise a light-emitting diode (LED) operatively connected to the microcontroller; a vibration motor operatively connected to the microcontroller; a battery charger operatively connected to the microcontroller; a battery operatively connected to the battery charger; and a universal serial bus (USB) port operatively connected to the microcontroller, wherein the electronic components collectively provide at least one manner of measuring and reporting in real-time any of a contact and a force of the ball on the location of the sweet spot on the bat, wherein upon the ball contacting the location of the sweet spot on the bat and coincident to at least one sensor, the RF transceiver transmitting a wireless signal to a linked device that is wirelessly paired to the RF transceiver, wherein a transmission of the wireless signal to the linked device provides information in real-time relating to the any of a contact and a force of the ball on the location of the sweet spot on the bat, and wherein a transmission of the wireless signal to the linked device provides input for a video game in real-time. The wirelessly linked device may comprise any of a smartphone, a tablet computer, a notebook computer, and a personal computer.

Another embodiment provides a sports performance improvement system comprising a sleeve configured to slide over a sports bat, wherein the sports bat comprises a handle, a barrel positioned opposite to the handle, and an area in between the handle and the barrel comprising a sweet spot, wherein a location of the sweet spot on the bat comprises a location that transfers a maximum energy to a ball that is contacted by the bat and produces a minimal vibration at the handle of the bat, and wherein the sleeve comprises an inner portion comprising low friction material, wherein the inner portion comprises a pocket; at least one sensor housed in the pocket and positioned to be located coincident with a sweet spot of the bat; an outer portion comprising a marking corresponding with the location of the sweet spot on the bat, wherein the marking is positioned above the at least one sensor that is coincident with the location of the sweet spot on the bat; an end cap positioned over the sleeve and housing electronic components, wherein the end cap is positioned over a barrel of the bat; and an electrical connection within the inner portion of the sleeve and connected to the at least one sensor and the end cap, wherein the electronic components comprise any of a microcontroller; an on-device memory operatively connected to the microcontroller, wherein the on-device memory comprises computer-readable files comprising pre-recorded audio; an audio amplifier operatively connected to the on-device memory; an audio speaker operatively connected to the audio amplifier; a radio frequency (RF) transceiver operatively connected to any of the audio amplifier and the on-device memory, wherein the RF transceiver comprises any of a wireless local area network (WLAN) transceiver; a personal area network (PAN) transceiver; a WiFi® transceiver; a Bluetooth® transceiver; and a low energy Bluetooth® transceiver.

The electronic components further comprise a light-emitting diode (LED) operatively connected to the microcontroller; a vibration motor operatively connected to the microcontroller; a battery charger operatively connected to the microcontroller; a battery operatively connected to the battery charger; and a universal serial bus (USB) port operatively connected to the microcontroller, wherein the electronic components collectively provide at least one manner of measuring and reporting in real-time any of a contact and a force of the ball on the location of the sweet spot on the bat, and wherein upon the ball contacting the location of the sweet spot on the bat and coincident to at least one sensor, the pre-recorded audio is output through the audio speaker.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein. As used herein, the terms "a" or "an" are used, as is common in patent documents, include one or more than one. In this document, the term "or" is used to refer to a "nonexclusive or" unless otherwise indicated.

The embodiments herein provide embedded wireless sensors for sports training and performance enhancement by improving an athlete's ability to make contact with a ball on the sweet spot of a bat. More particularly, the embodiments herein provide a lightweight sweet spot trainer embodied as a sleeve that is slipped over (and removable from) the barrel end of any bat including an athlete's own personal bat(s). The sleeve covers the barrel over the primary contact area of the bat. The sleeve holds a force sensor placed inside it such that, when slid over the bat, the force sensor is coincident with the sweet spot of the bat. When a ball comes in contact with the sweet spot, the force sensor directly beneath it is triggered such that instantaneous feedback is given to the athlete thereby making him/her aware of accurate sweet spot contact. Moreover, an array of cylindrical contact/force sensors can be positioned such that the user gets feedback that would depend on how far from the sweet spot the user strikes/contacts the ball. The user may be notified by audio, visual, or sensory cues. In addition, information can be sent to a Wireless Local Area Network (WLAN) enabled device, a Bluetooth® or Low Energy Bluetooth® device, the Internet, and the cloud.

Pairing the sweet spot trainer with a smartphone or tablet permits the player to engage in a realistic immersive video game in which the player can compete with another player or other players, choose a ballpark in which to play, or choose a team or pitcher. The player could also use a smartphone or tablet to monitor and track performance over time. Referring now to the drawings, and more particularly to FIGS. 1 through 10, where similar reference characters denote corresponding features consistently throughout the figures, there are shown preferred embodiments.

Figure 1:
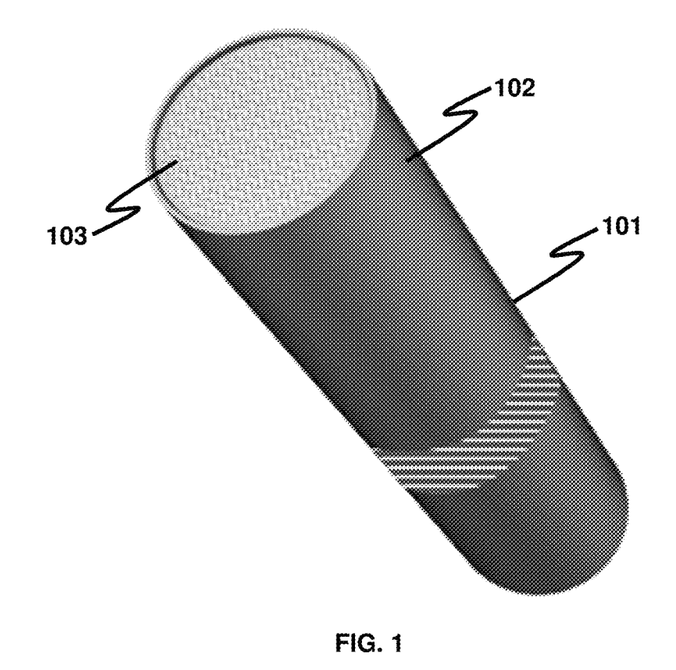
FIG. 1 illustrates a schematic diagram of a sleeve according to an embodiment herein.
Figure 2:
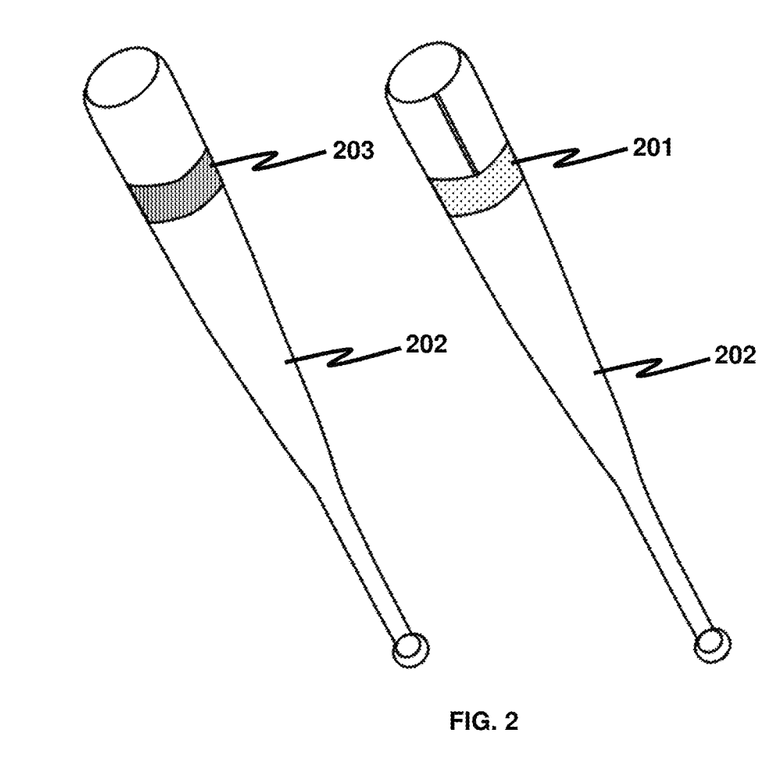
FIG. 2 illustrates a schematic diagram of a sensor on a bat according to an embodiment herein.

FIG. 1 illustrates a schematic diagram of a sleeve 101 according to an embodiment herein. The pliable cylindrical sleeve 101 is dimensioned and configured to be of sufficient length to cover the length of a bat from the end of the barrel to beyond the sweet spot. The sleeve 101 comprises an exterior surface 102 of synthetic rubber or fiber and an interior material of cotton or synthetic fiber 103. FIG. 2, with reference to FIG. 1, illustrates a schematic diagram of a sensor 201 on a bat 202 according to an embodiment herein. A single force or contact sensors 201 may be configured in any of a square, rectangular, or circular shape, and corresponding to and covering the sweet spot 203 of the bat 202.

Figure 3:
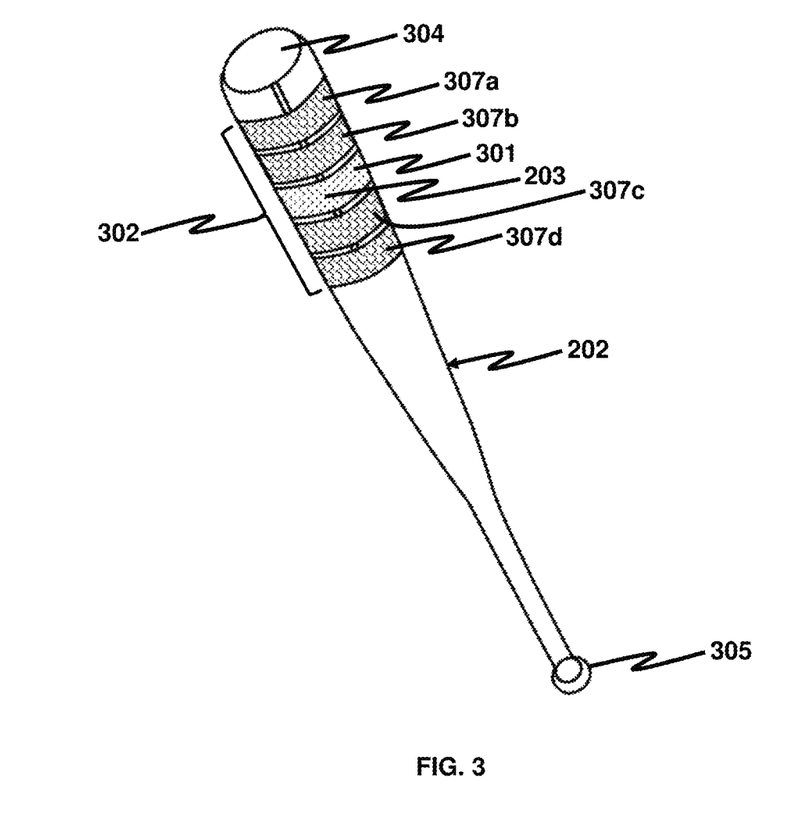
FIG. 3 illustrates a schematic diagram of an array of sensors on a bat according to an embodiment herein.
Figure 4:
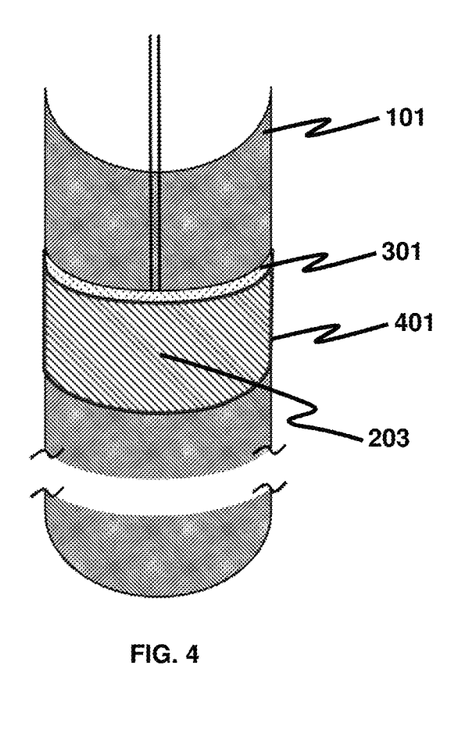
FIG. 4 illustrates another schematic diagram of a sleeve according to an embodiment herein.

FIG. 3, with reference to FIGS. 1 and 2, illustrates a schematic diagram of an array of sensors 302 on a bat 202 according to an embodiment herein. A single sensor 301 and the array of thin force or contact sensors 302 may each be configured in any of a square, rectangular, or circular shape, with the central sensor 301 covering the sweet spot 203 and additional sensors 307a-307d arrayed away from the sweet spot 203 towards the base 304 of the bat 202 and towards the handle 305 of the bat 202. FIG. 4, with reference to FIGS. 1 through 3, illustrates another schematic diagram of a sleeve 101 according to an embodiment herein. A pocket 401 on the interior of the sleeve 101 that holds the force sensor or force sensors such that a single sensor 201 or the central sensor 301 in an array of sensors (e.g., array of sensors 302 of FIG. 3) is aligned with the sweet spot 203 of the bat (e.g., bat 202 of FIGS. 2 and 3).

Figure 5:
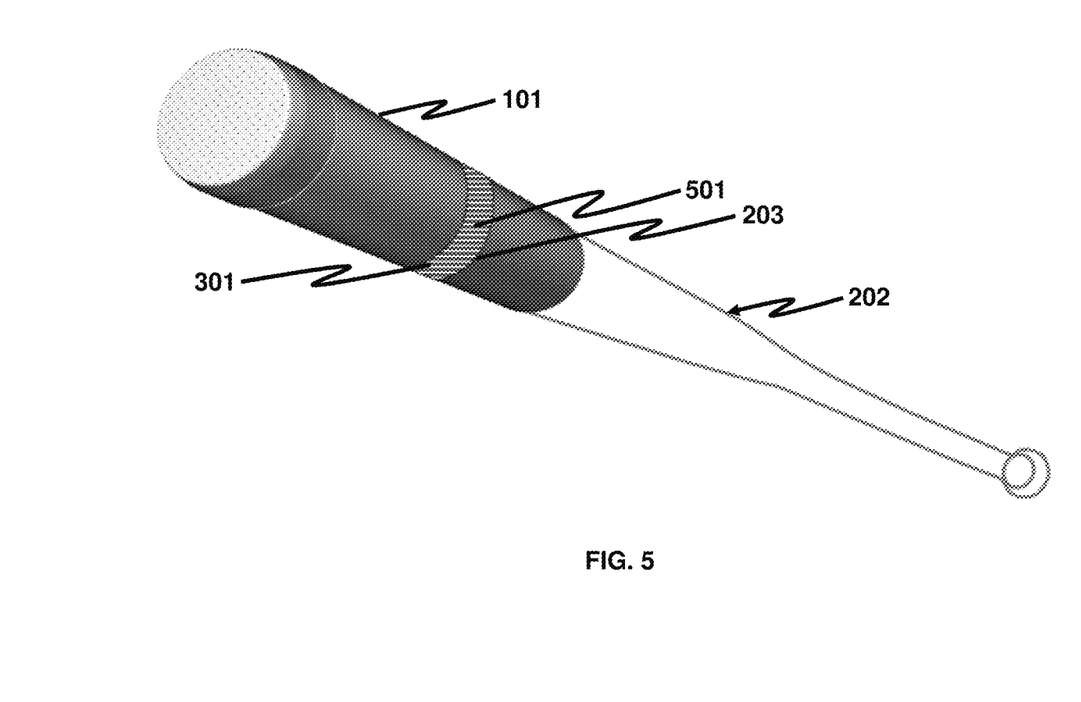
FIG. 5 illustrates a schematic diagram of a sleeve on a bat including a pocket according to an embodiment herein.
Figure 6:
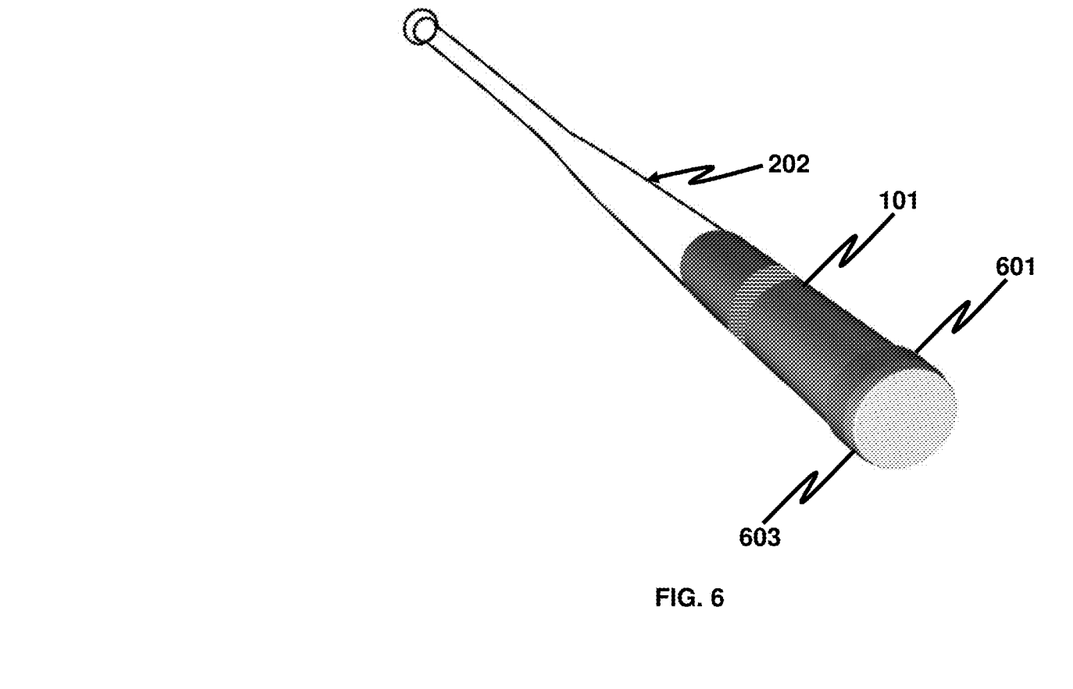
FIG. 6 illustrates another schematic diagram of a sleeve with a cap on a bat according to an embodiment herein.
Figure 7:
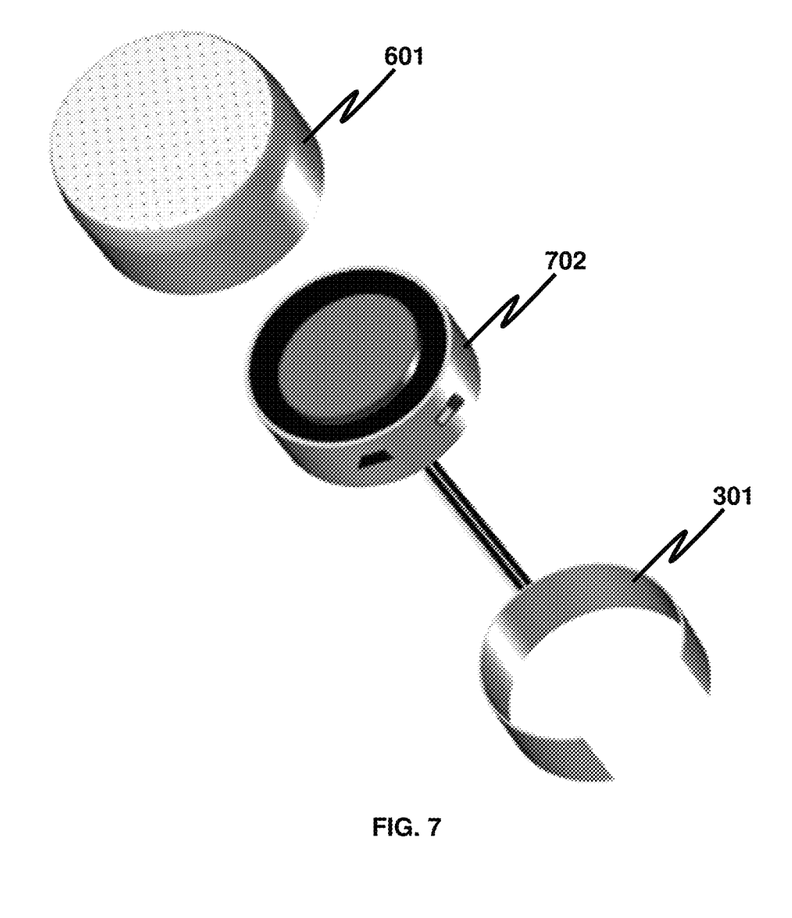
FIG. 7 illustrates an exploded view of a cap according to an embodiment herein.

FIG. 5, with reference to FIGS. 1 through 4, illustrates a schematic diagram of a sleeve 101 on a bat 202 according to an embodiment herein. A marking 501 on the exterior of the sleeve 101 marks the location of the sweet spot 203 and corresponds with the position of the sweet spot sensor 301. FIG. 6, with reference to FIGS. 1 through 5, illustrates another schematic diagram of a sleeve 101 with a cap 601 on a bat 202 according to an embodiment herein. The closed-end cap 601 is attached to the sleeve 101, which fits snugly over the end of the barrel 603 of the bat 202. The sleeve 101 and cap 601 may be removed from the bat 202 and used on other bats. FIG. 7, with reference to FIGS. 1 through 6, illustrates an exploded view of the cap 601 according to an embodiment herein. The cap 601 houses an electronics module 702 connected to the force or contact sensor 301.

Figure 8:
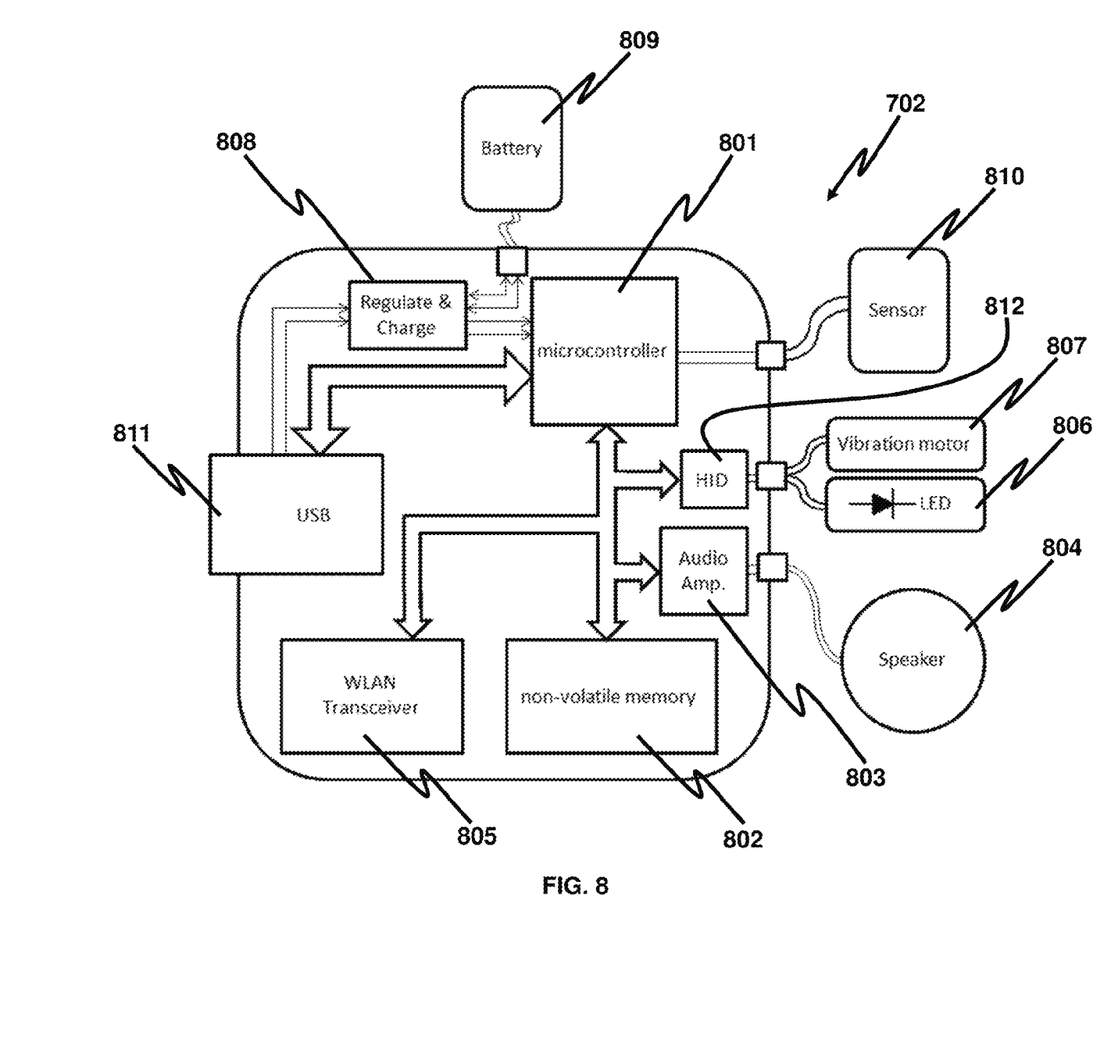
FIG. 8 illustrates a block diagram of an electronics module according to an embodiment herein.

FIG. 8, with reference to FIGS. 1 through 7, illustrates a block diagram of an electronics module 702 according to an embodiment herein. The electronics module 702 includes, but is not limited to, a microcontroller 801, on-device memory 802, audio amplifier 803, audio speaker 804, Wireless Local Area Network, Personal Area Network, WiFi®, Bluetooth® or Low Energy Bluetooth® transceiver 805, light-emitting diodes (LEDs) 806, vibration motor 807, battery charger 808, battery 809, force or contact sensor 810, universal serial bus (USB) port 811, and a human interface device (HID) controller 812.

Figure 9:
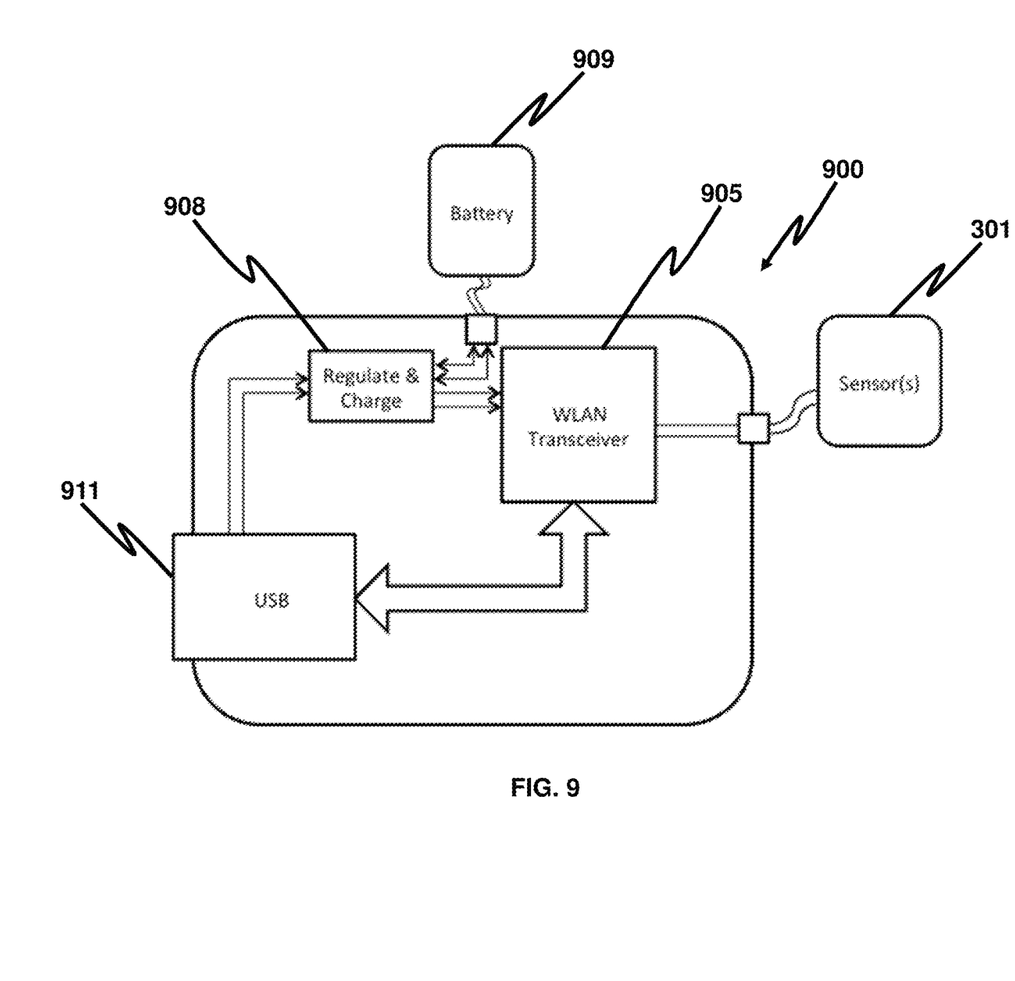
FIG. 9 illustrates a block diagram of another electronics module according to an embodiment herein.

FIG. 9, with reference to FIGS. 1 through 8, illustrates a block diagram of another electronics module 900 according to an embodiment herein. The electronics module 900 includes, but is not limited to a radio frequency (RF) WLAN transceiver 905, battery charger 908, battery 909, force or contact sensor(s) 301, and USB port 911.

Figure 10:
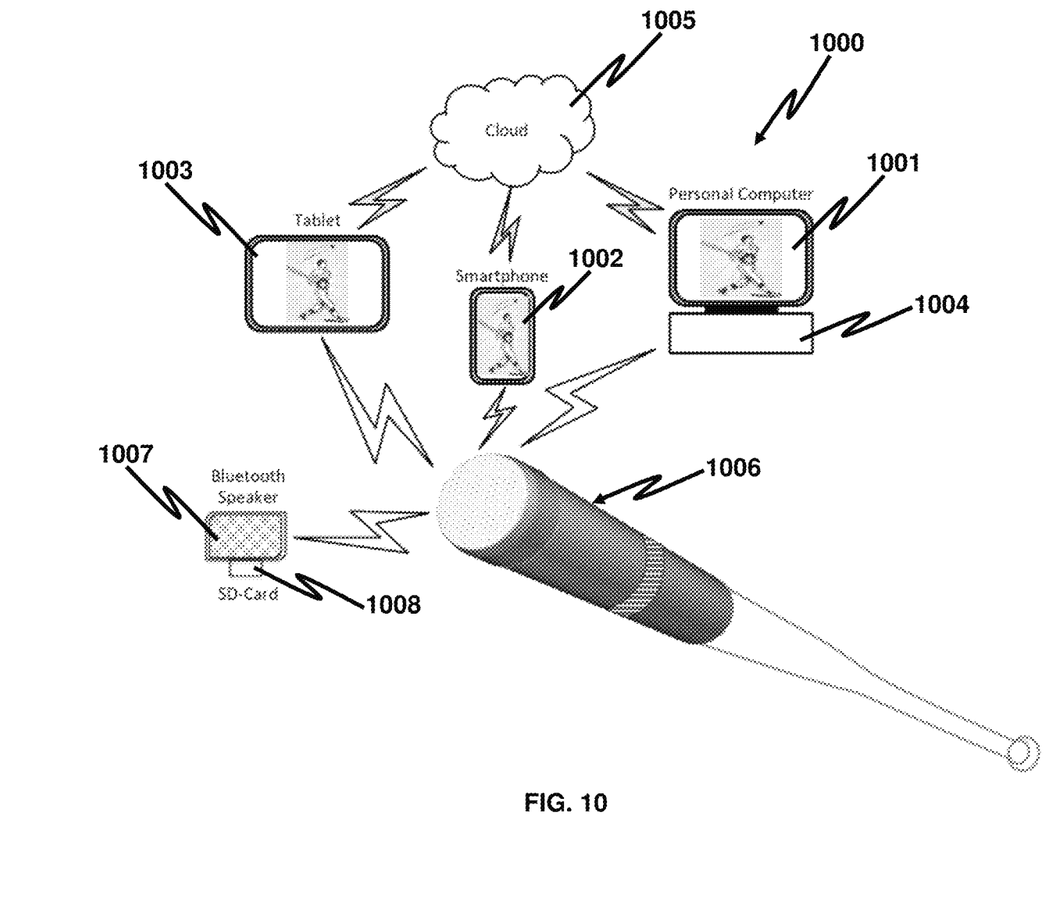
FIG. 10 illustrates a system according to an embodiment herein.

FIG. 10, with reference to FIGS. 1 through 9, illustrates a system 1000 according to an embodiment herein. A video game 1001 may be running on a smartphone 1002, tablet 1003, or personal computer 1004 communicatively linked to the cloud 1005, and paired with the sweet spot trainer 1006. The sweet spot trainer 1006 may be paired directly or indirectly with a Bluetooth® or Low Energy Bluetooth® audio player 1007 that may include a secure digital (SD) memory card 1008.

With reference to FIGS. 1 through 10, the sweet spot trainer device 1006 comprises a pliable cylindrical sleeve 101 terminated at one end (e.g., barrel 603 end of the bat 202) with a closed-end cap 601. The sleeve 101 has a rubber or synthetic rubber exterior surface 102 and an interior cotton or synthetic fiber material 103. The sleeve 101 has the ability to expand to some extent to fit snugly over the barrel 603 of the bat 202 having a diameter of approximately 2.25 inches to 2.75 inches, in one non-limiting example. The closed-end of the sleeve 101 fits snugly around the barrel end 603 and is attached to the sleeve 101 that extends from the barrel 603 of the bat 202 to a few inches, for example, beyond the location of the sweet spot 203.

The location of the sweet spot 203 is very uniform on bats, usually between approximately 5½ and 6½ inches, for example, from the barrel end 603 of the bat 202. Numerous studies have been conducted to identify the location of the sweet spot 203 showing great consistency. The location of the sweet spot 203 on the bat 202 comprises a location that transfers a maximum energy to a ball (e.g., maximum energy that a bat 202 can transfer to a ball given a specified amount of force) that is contacted by the bat 202 and produces a minimal vibration at the handle 305 of the bat 202 (e.g., minimal vibration compared with the vibration generated at the handle 305 when the bat 202 strikes a ball at a location not on the sweet spot 203 of the bat 202). The size of the sweet spot 203 varies, with wood bats having the smallest sweet spot 203 of approximately a one-inch width cylinder and metal bats going up to approximately a two-inch width cylinder. The outside of the sleeve 101 has a marking 501 of the sweet spot 203 so the user can orient the sleeve 101 on the opposite side to the trademark insignia (not shown) of the bat 202, such that the exterior marking 501 aligns with the position of the sweet spot 203 of the bat 202.

A thin force sensor 201, 301 or array of force sensors 302 is housed in a pocket 401 located in the interior of the sleeve 101 directly underneath the area where the marking 501 of the sweet spot 203 is located on the exterior of the sleeve 101. The force sensor(s) 201, 301 is connected to the microcontroller 801 or to an RF transceiver 805. This microcontroller 801 or RF transceiver 805 is used to determine contact with the force sensor 201, 301 and trigger the feedback mechanism to the user. The cap 601 at the end of the sleeve 101 houses the electronics modules 702, 900, including a battery 909 and one or more feedback devices. The feedback devices may include one or more of an audio speaker 804, a vibration motor 807, an LED 806, and an RF transceiver 805, 905. The cap 601 may also house a USB connection 811, 911 for charging of the battery 909, for reprogramming the electronics module 702, 900, or for downloading sound files to the external memory 802 of the microcontroller 801. The cap 601 may also house an on-off switch (not shown) and LEDs 806.

When an athlete/user strikes a ball on the sweet spot 203 of the bat 202, he/she receives immediate feedback by way of an audio signal by way of the audio amplifier 803 and speaker 804 either directly from the bat 202 or from a Bluetooth® audio speaker system 1007 paired with the bat 202, LEDs 806, or vibration motor 807. For direct audio feedback from the bat 202 itself, the memory 802 will have some audio files pre-saved, but may also allow the user to save his/her own audio files. The LED 806 may include a predetermined visual display programmed into the microcontroller 801. The vibration motor 807 may include a sensation transmitted through the bat 202 to the user. For audio feedback from a paired Bluetooth® audio device 1007, an SD-memory card 1008 in the Bluetooth® audio device 1007 can be pre-loaded with audio files of the user's choosing.

In the case of an array of force sensors 302, when an athlete strikes the ball in a location other than the sweet spot 203, corresponding to the locations of the array of force sensors 302 not covering the sweet spot 203, a different form of immediate feedback can be given. The RF transceiver 805, 905 will allow the information to be transmitted to an RF-enabled device 1002, 1003, 1004 that may be paired with the sweet spot trainer 1006.

Pairing the sweet spot trainer 1006 with a smartphone 1002 or tablet 1003 permits the athlete to monitor his/her performance over time or to play an immersive video game 1001 in which the athlete would compete with another athlete or other players, choose a ballpark, choose a team, or choose a pitcher. When used in a batting cage, the pairing of the sweet spot trainer 1006 with a smartphone 1002 or tablet 1003 could incentivize athletes to perform at their highest level.

The embodiments herein provide a sweet spot trainer device 1006 that is portable, lightweight, and easily adaptable to different size bats, can be placed on the athlete's own bat, and is easy to use. The device 1006 can be used by players of all ages, can fit most bats, is durable, and gives the user definitive feedback that is not available in conventional solutions.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A sports performance improvement system comprising:
    a sleeve configured to slide over a sports bat, wherein said sports bat comprises a handle, a barrel positioned opposite to said handle, and an area in between said handle and said barrel comprising a sweet spot, wherein a location of said sweet spot on said bat comprises a location that transfers a maximum energy to a ball that is contacted by said bat and produces a minimal vibration at said handle of said bat, and wherein said sleeve comprises:
        an inner portion comprising low friction material, wherein said inner portion comprises a pocket;
        at least one sensor housed in said pocket and positioned to be located coincident with a sweet spot of said bat;
        an outer portion comprising a marking corresponding with said location of said sweet spot on said bat, wherein said marking is positioned above said at least one sensor that is coincident with said location of said sweet spot on said bat;
    an end cap positioned over said sleeve and housing electronic components, wherein said end cap is positioned over a barrel of said bat; and
    an electrical connection within said inner portion of said sleeve and connected to said at least one sensor and said end cap,
    wherein said electronic components comprise any of:
        a microcontroller;
        an on-device memory operatively connected to said microcontroller;
        an audio amplifier operatively connected to said on-device memory;
        an audio speaker operatively connected to said audio amplifier;

a radio frequency (RF) transceiver operatively connected to any of said audio amplifier and said on-device memory, wherein said RF transceiver comprises any of:
a wireless local area network (WLAN) transceiver;
a personal area network (PAN) transceiver;
a WiFi® transceiver;
a Bluetooth® transceiver; and
a low energy Bluetooth® transceiver;
a light-emitting diode (LED) operatively connected to said microcontroller;
a vibration motor operatively connected to said microcontroller;
a battery charger operatively connected to said microcontroller;
a battery operatively connected to said battery charger; and
a universal serial bus (USB) port operatively connected to said microcontroller,
wherein said electronic components collectively provide at least one manner of measuring and reporting in real-time any of a contact and a force of said ball on said location of said sweet spot on said bat.

2. The system of claim 1, wherein said low friction material is configured to allow said sleeve to slide over said barrel of said bat.

3. The system of claim 1, wherein said at least one sensor measures a location of said ball contacting said bat.

4. The system of claim 1, wherein said at least one sensor measures an area of contact between said ball contacting said bat.

5. The system of claim 1, wherein said at least one sensor measures a contact force of said ball contacting said bat.

6. The system of claim 1, wherein said outer portion of said sleeve comprises flexible material.

7. The system of claim 6, wherein said flexible material is configured to hold said sleeve in tight contact with said barrel of said bat.

8. The system of claim 1, wherein said on-device memory comprises computer-readable files comprising pre-recorded audio.

9. The system of claim 8, wherein said audio speaker outputs said pre-recorded audio in real-time.

10. The system of claim 8, wherein upon said ball contacting said location of said sweet spot on said bat and coincident to at least one sensor, said pre-recorded audio is output through said audio speaker.

11. The system of claim 1, wherein upon said ball contacting said location of said sweet spot on said bat and coincident to at least one sensor, said LED lighting up in a predetermined pattern for a predetermined period of time.

12. The system of claim 1, wherein upon said ball contacting said location of said sweet spot on said bat and coincident to at least one sensor, said vibration motor turning on for a predetermined period of time.

13. The system of claim 1, wherein upon said ball contacting said location of said sweet spot on said bat and coincident to at least one sensor, said RF transceiver transmitting a wireless signal to a linked device that is wirelessly paired to said RF transceiver.

14. The system of claim 13, wherein said wirelessly linked device comprises any of a smartphone, a tablet computer, a notebook computer, and a personal computer.

15. The system of claim 13, wherein a transmission of said wireless signal to said linked device provides information in real-time relating to said any of a contact and a force of said ball on said location of said sweet spot on said bat.

16. The system of claim 13, wherein a transmission of said wireless signal to said linked device provides input for a video game in real-time.

17. The system of claim 1, wherein said at least one sensor comprises any of a single sensor and an array of thin force or contact sensors.

18. A sports performance improvement system comprising:
a sleeve configured to slide over a sports bat, wherein said sports bat comprises a handle, a barrel positioned opposite to said handle, and an area in between said handle and said barrel comprising a sweet spot, wherein a location of said sweet spot on said bat comprises a location that transfers a maximum energy to a ball that is contacted by said bat and produces a minimal vibration at said handle of said bat, and wherein said sleeve comprises:
an inner portion comprising low friction material, wherein said inner portion comprises a pocket;
at least one sensor housed in said pocket and positioned to be located coincident with a sweet spot of said bat;
an outer portion comprising a marking corresponding with said location of said sweet spot on said bat, wherein said marking is positioned above said at least one sensor that is coincident with said location of said sweet spot on said bat;
an end cap positioned over said sleeve and housing electronic components, wherein said end cap is positioned over a barrel of said bat; and
an electrical connection within said inner portion of said sleeve and connected to said at least one sensor and said end cap,
wherein said electronic components comprise any of:
a microcontroller;
an on-device memory operatively connected to said microcontroller;
an audio amplifier operatively connected to said on-device memory;
an audio speaker operatively connected to said audio amplifier;
a radio frequency (RF) transceiver operatively connected to any of said audio amplifier and said on-device memory, wherein said RF transceiver comprises any of:
a wireless local area network (WLAN) transceiver;
a personal area network (PAN) transceiver;
a WiFi® transceiver;
a Bluetooth® transceiver; and
a low energy Bluetooth® transceiver;
a light-emitting diode (LED) operatively connected to said microcontroller;
a vibration motor operatively connected to said microcontroller;
a battery charger operatively connected to said microcontroller;
a battery operatively connected to said battery charger; and
a universal serial bus (USB) port operatively connected to said microcontroller,
wherein said electronic components collectively provide at least one manner of measuring and reporting in real-time any of a contact and a force of said ball on said location of said sweet spot on said bat,
wherein upon said ball contacting said location of said sweet spot on said bat and coincident to at least one sensor, said RF transceiver transmitting a wireless signal to a linked device that is wirelessly paired to said RF transceiver, wherein a transmission of said wireless signal to said linked device provides information in real-time relating to said any of a contact and a force of said ball on said location of said sweet spot on said bat, and wherein a transmission of said wireless signal to said linked device provides input for a video game in real-time.

19. The system of claim 18, wherein said wirelessly linked device comprises any of a smartphone, a tablet computer, a notebook computer, and a personal computer.

20. A sports performance improvement system comprising:
- a sleeve configured to slide over a sports bat, wherein said sports bat comprises a handle, a barrel positioned opposite to said handle, and an area in between said handle and said barrel comprising a sweet spot, wherein a location of said sweet spot on said bat comprises a location that transfers a maximum energy to a ball that is contacted by said bat and produces a minimal vibration at said handle of said bat, and wherein said sleeve comprises:
  - an inner portion comprising low friction material, wherein said inner portion comprises a pocket;
  - at least one sensor housed in said pocket and positioned to be located coincident with a sweet spot of said bat;
  - an outer portion comprising a marking corresponding with said location of said sweet spot on said bat, wherein said marking is positioned above said at least one sensor that is coincident with said location of said sweet spot on said bat;
- an end cap positioned over said sleeve and housing electronic components, wherein said end cap is positioned over a barrel of said bat; and
- an electrical connection within said inner portion of said sleeve and connected to said at least one sensor and said end cap, wherein said electronic components comprise any of:
- a microcontroller;
- an on-device memory operatively connected to said microcontroller, wherein said on-device memory comprises computer-readable files comprising pre-recorded audio;
- an audio amplifier operatively connected to said on-device memory;
- an audio speaker operatively connected to said audio amplifier;
- a radio frequency (RF) transceiver operatively connected to any of said audio amplifier and said on-device memory, wherein said RF transceiver comprises any of:
  - a wireless local area network (WLAN) transceiver;
  - a personal area network (PAN) transceiver;
  - a WiFi® transceiver;
  - a Bluetooth® transceiver; and
  - a low energy Bluetooth® transceiver;
- a light-emitting diode (LED) operatively connected to said microcontroller;
- a vibration motor operatively connected to said microcontroller;
- a battery charger operatively connected to said microcontroller;
- a battery operatively connected to said battery charger; and
- a universal serial bus (USB) port operatively connected to said microcontroller, wherein said electronic components collectively provide at least one manner of measuring and reporting in real-time any of a contact and a force of said ball on said location of said sweet spot on said bat, and wherein upon said ball contacting said location of said sweet spot on said bat and coincident to at least one sensor, said pre-recorded audio is output through said audio speaker.

* * * * *